United States Patent [19]

Sullivan et al.

[11] 4,166,630
[45] Sep. 4, 1979

[54] CHILD PROPELLED RIDING TOY

[76] Inventors: Paul J. Sullivan, 300 Metacom Ave., Bristol, R.I. 02809; Fredric C. Behling, 657 Exmmor Ct., Crystal Lake, Ill. 60014; George W. Ptaszek, East Ave., Pascoag, R.I. 02859

[21] Appl. No.: 899,809

[22] Filed: Apr. 25, 1978

[51] Int. Cl.² ............................................. B62M 1/00
[52] U.S. Cl. .............................. 280/87.02 R; 280/7.1
[58] Field of Search ...................... 280/87.02 R, 87.01, 280/87.03, 87.04 R, 87.05, 7.1, 12 L, 12 KL

[56] References Cited

U.S. PATENT DOCUMENTS

| 1,288,588 | 12/1918 | Holt et al. | 280/7.1 |
| 1,533,837 | 4/1925 | Douglas | 280/87.04 R |
| 1,668,623 | 5/1928 | Avril | 280/87.02 R |
| 2,448,427 | 8/1948 | Gordon | 280/87.04 R X |
| 2,615,722 | 10/1952 | Johnson | 280/87.02 R X |
| 2,616,715 | 11/1952 | Billings | 280/12 KL |
| 3,059,943 | 10/1962 | Rich | 280/87.02 R |
| 3,109,667 | 11/1963 | Wolner | 280/87.02 R |
| 4,029,329 | 6/1977 | Chambers | 280/87.02 R |

Primary Examiner—Joseph F. Peters, Jr.
Assistant Examiner—Milton L. Smith
Attorney, Agent, or Firm—Salter & Michaelson

[57] ABSTRACT

A child's riding toy of an overall "scooter" type configuration. A longitudinally orientated vehicle body having supporting wheels at the forward and rear ends thereof is adapted to support one of the knees of the child riding thereon. An outrigger portion extends laterally from the side of the body and is provided with a third wheel so as to enable three-point rolling support for the vehicle. Separate handles are provided above the forward and outrigger wheels such that the child may simultaneously grasp both such handles while supporting his body in a forward leaning position above the vehicle while the unsupported leg is available for propulsion. The forward wheel is capable of limited pivoted movement with respect to the vehicle body such that the child may steer the vehicle through a variety of exciting turning maneuvers.

9 Claims, 5 Drawing Figures

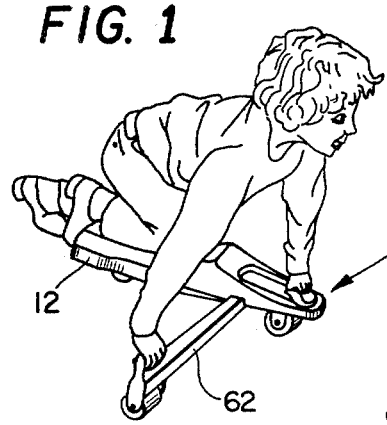
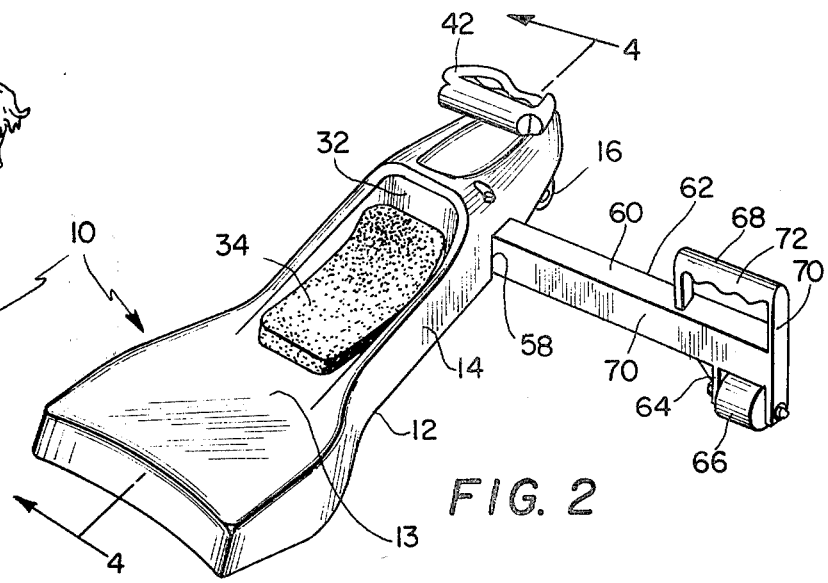
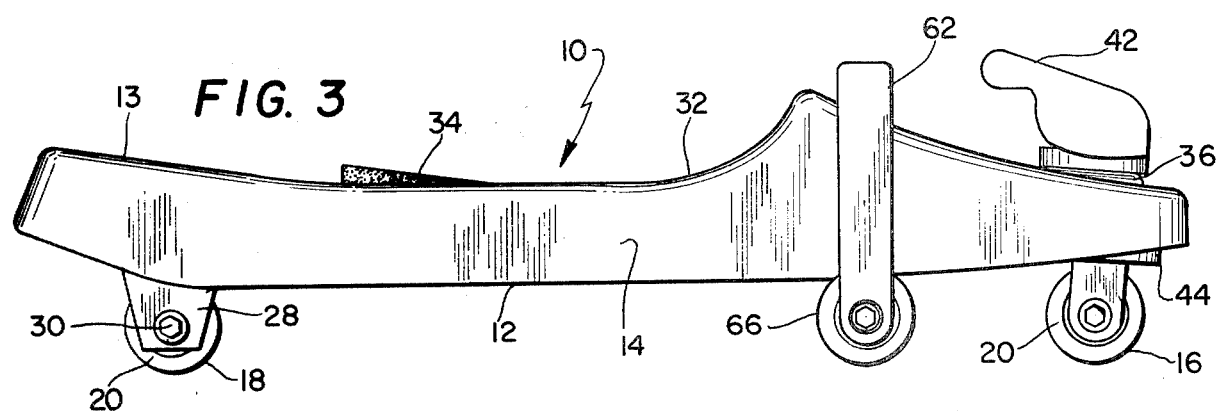
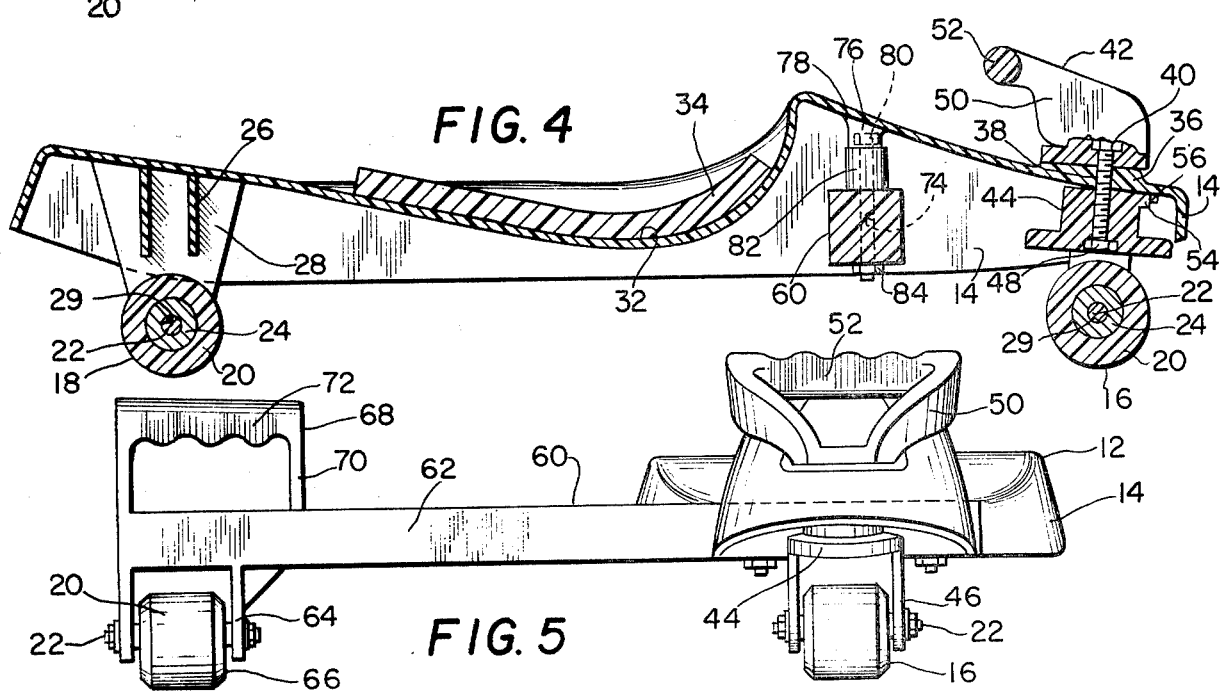

CHILD PROPELLED RIDING TOY

BACKGROUND AND SUMMARY OF THE INVENTION

This invention relates to a wheeled vehicle and particularly to a child operated, propelled and supporting toy. Devices of this general nature are well-known and include the coaster or scooter-type devices adapted to support the child's body with one leg in contact with the vehicle and the other leg available for periodic push type propulsion. Such relatively tame old-fashioned toys lack excitement and hence have only limited appeal to today's children and are, therefore, not greatly popular. Such toys do, however, offer a desirable combination of excercise, coordination and play value, and hence if offered in up-to-date constructional designs, could have renewed appeal to today's youngsters. It is accordingly a primary object of the present invention to provide a wheeled vehicle of the very general type above described, but of a novel construction which provides an exciting, high play value toy which will appeal to today's children.

A further object of the present invention is the provision of a wheeled vehicle of the aforementioned type in which three-point wheeled contact support is provided such that one leg and both arms of the child rider may be supported thereby during use.

A still further object of the present invention is the provision of a wheeled vehicle of the immediately aforementioned type which is furthermore of a relatively simple, low-cost construction and yet which is safe, easy and exciting to operate.

These and other objects of the present invention are accomplished by the provision of a toy wheeled vehicle having a generally longitudinally orientated body member supported for rolling movement by a pair of wheels respectively positioned at forward and rear portions of the body. The body further includes a generally centrally disposed recess portion for supporting the knee of one of the child's legs while leaving the other leg free for propelling the vehicle. An outrigger support having a third wheel at its outer end extends laterally from the vehicle body. Hand supports are provided above the outrigger and forward wheels so that the child may be supported thereby in a generally forward leaning position. The forward wheel is capable of being turned in a limited arcuate path so that the child may in effect steer the vehicle through a variety of turns and similar maneuvers while totally or partially supported by the vehicle.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is a prespective view of a child operating the device of the present invention in the intended manner;

FIG. 2 is a perspective view showing the wheeled vehicle of the present invention;

FIG. 3 is a side elevational view thereof;

FIG. 4 is a sectional view taken along the line 4—4 of FIG. 2; and

FIG. 5 is a front elevational view thereof.

DESCRIPTION OF THE INVENTION

Turning now to the drawing, the toy vehicle 10 of the present invention is shown in its normal use or play position. Vehicle 10 includes a generally longitudinally orientated body member 12, preferably of molded one-piece plastic construction, including a horizontally orientated upper surface 13 and having a relatively narrow forward portion and an upwardly extending and widened or fan-shaped rear portion. The peripheral portions of the upper surface 13 of the body member 12 terminate in a downwardly extending flange 14 which assists in adding rigidity to the body member. Wheel assemblies 16, 18 are respectively mounted at the forward and rear portions of the body member 12 generally along the longitudinal center line of such member, and accordingly support the member for rolling movement. Both wheel assemblies include a roller element 20 which may be molded of polyurethene plastic material and is supported on an axle 22 by a bearing 24.

The rear portion of the body member 12 includes a pair of lateral support members 26 which extend across the width of te body member and terminate at the opposite flanges 14 thereof. Centrally connected to the supports 26 is a pair of spaced trunnions 28 which downwardly extend from the upper surface 13 and are provided with a pair of spaced aligned openings 29 for receipt of the rear axle 22. The axle and, accordingly, the rear wheel assembly 18 is fastened to the trunnions 28 by means of fastening nuts 30. The central portion of the upper surface 13 of the body member 12 is provided with a longitudinally orientated recess 32 in which a knee pad of suitable resilient material is connected, as by adhesion, and in this manner provides support for one knee of the child operating the device. In this regard, it should be noted that the extent and elevation of the rear part of the body member is such that the foot and shoe portion of the average size child operating the device will extend to the rear of the body member in a comfortable position above the ground. This configuration reduces the possibility of the child's toe of his or her supported foot dragging on the pavement or other supporting surface while the device is moving.

The front of the body member terminates in a somewhat blunt rounded end which provides for substantial rigidity in the support of the front wheel assembly 16. In this regard, the upper portion of the body member 12 may further be provided with a thickened boss or pad 36 in the forwarded area thereof and through which an opening 38 is provided for receipt of a threaded bolt 40. The bolt in turn serves to connect a steering assembly 42 to a hub 44 from which in turn the roller 20 of the front wheel 16 is supported between a pair of downwardly extending trunnions 46. As in the rear wheel assembly 18, the forward wheel is supported by an axle and a bearing 22, 24 respectively. A nut 48 at one end of the threaded bolt 40 serves to connect the hub member to the steering element 42. The steering assembly 42 in turn includes a pair of spaced side supports 50 and a connecting handle member 52. The handle 52 serves, as best seen in FIG. 1, as a support for the child's left arm, that is, the arm opposite to the leg supported on the vehicle within the recess 12.

Inasmuch as the steering assembly 42, the hub 44 and the front wheel assembly 16 are connected as a unit, they are free to pivotally move with respect to the forward end of the body member 12, and it is through such movement that the vehicle 10 may be steered by the child simply by turning the assembly 42 in either direction. In order to prevent a full 90 degree movement of the front wheel assembly 16 which would place the front roller 20 in a cross-wise or skid position, the forward end of the hub 44 is provided with a finger or extension 54 at the upper end thereof. Stops 56 which downwardly extend from the upper surface 13 of the body member 12 are provided at points about 45 degrees on either side of center in the arcuate travel path of such extension 54. Accordingly, the hub 44 and thus the front wheel assembly 16 is prevented from full turning movement.

Slightly forward of the recess 32 and to the rear of the front wheel assembly 16, the flange 14 is provided with a pair of aligned cutouts 58 on either side thereof. The cutouts 58 are adapted to receive the supporting arm 60 of an outrigger 62 which as shown in the drawing, is adapted to laterally outwardly extend from the body member 12. The outrigger 62 is provided at its outer end with a pair of spaced downwardly extending trunnions 64 which in turn support a third wheel assembly 66. Such wheel assembly 66 includes a roller 20 having a bearing 24 and supported on an axle 22 for rotation as in the previously discussed wheel assemblies 16, 18. An outrigger handle 68 is provided at the upper surface of the terminal end of the support arm 60. Such handle upwardly extends from the support arm 60, and accordingly is positioned generaly above the third wheel assembly 66. The outrigger handle 68 includes a pair of spaced bars 70 and a connecting grip member 72. The handle 68 serves to support the right arm of the child as best shown in FIG. 1.

Although the outrigger 62 is shown positioned to the right of the body member 12 in the drawing, it should be clear that such may be adapted to be positioned on either side thereof and for this purpose the support arm 60 is provided with a pair of spaced vertically extending openings 74 through which a pair of bolts 76 are adapted to interconnect the support arm 60 to the body member 12. Thus, by removing the bolts 76, orientating the outrigger to the left side of the body member and refastening the bolts 76, the orientation of the outrigger may be changed in accordance to the desire of the child playing with the device 10. Obviously, when the outrigger extends to the left of the body member, the left knee and leg of the child will be supported in the recess 32 and the right leg utilized to periodically push and thus propel the vehicle in the manner intended. In this regard, the upper surface 13 of the body member 12 is provided with a pair of spaced depressions 78 to accommodate the heads 80 of the bolts 76. Furthermore, a hollow spacer 82 is disposed between the upper surface of the support 60 and the lower surface of the depression 78. A nut or other conventional fastening means 84 serves to interconnect the outrigger 62 to the body member 12.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A wheeled vehicled comprising a generally longitudinally orientated body member supported for rolling movement by a pair of wheels connected thereto and in generally longitudinal alignment with each other at forward and rear portions respectively of said body, said body further including a generally centrally disposed support area for one knee of an operator of said vehicle, steering means for simultaneously supporting the operator's hand opposite said one knee and for permitting turning of said front wheel, and an outrigger support for the other hand of the operator, said outrigger support laterally extending from one side of said body at a generally forward position thereof and provided with an additional vehicle supporting wheel at an outer portion thereof.

2. The wheeled vehicle of claim 1, said knee support area being a generally longitudinal orientated recess formed in said body, said recess positioned rearwardly of said forward and outrigger wheels.

3. The wheeled vehicle of claim 1, said outrigger wheel positioned rearwardly of said forward wheel.

4. The wheeled vehicle of claim 1, said hand supports generally respectively disposed directly above said forward and said outrigger wheels and further positioned respectively above said body and said outrigger.

5. The wheeled vehicle of claim 1, including stop means limiting the turning movement of said forward wheel to less than 90 degrees.

6. The wheeled vehicle of claim 5, said stop means comprising a finger radially outwardly extending from a rotatable wheel supporting hub disposed between said steering means and said forward wheel and disposed beneath said body member adapted to be contacted by said finger upon rotation of said steering means.

7. The wheeled vehicle of claim 1, said wheels defining a triangular shaped three-point support for said vehicle, said forward wheel mounted for limited pivotal movement with respect to said body member and the other wheels being fixed for movement in said longitudinal direction.

8. The wheeled vehicle of claim 1, said wheeled vehicle adapted for use in a generally flat horizontally orientated plane.

9. The wheeled vehicle of claim 1, said outrigger support being removably mounted for alternate disposition to either side of said body member.

* * * * *